US011105706B2

(12) United States Patent
Hilpert et al.

(10) Patent No.: US 11,105,706 B2
(45) Date of Patent: *Aug. 31, 2021

(54) HYDROSTATIC AND VIBRATION TEST METHOD FOR A BLOWOUT PREVENTER (71) Applicant: Engip LLC, Conroe, TX (US)

(72) Inventors: Clifford L. Hilpert, Conroe, TX (US); Jeffrey L. Hilpert, Conroe, TX (US)

(73) Assignee: Engip, LLC, Conroe, TX (US)

( * ) Notice: Subject to any disclaimer, the term of this patent is extended or adjusted under 35 U.S.C. 154(b) by 51 days.

This patent is subject to a terminal disclaimer.

(21) Appl. No.: 16/516,901

(22) Filed: Jul. 19, 2019

(65) Prior Publication Data

US 2019/0339156 A1 Nov. 7, 2019

Related U.S. Application Data (60) Continuation of application No. 16/247,683, filed on Jan. 15, 2019, now Pat. No. 10,393,616, which is a division of application No. 14/932,727, filed on Nov. 4, 2015, now Pat. No. 10,267,705.

(60) Provisional application No. 62/140,795, filed on Mar. 31, 2015.

(51) Int. Cl.
G01M 3/28 (2006.01)
E21B 47/117 (2012.01)
E21B 33/06 (2006.01)

(52) U.S. Cl.
CPC ........... G01M 3/2876 (2013.01); E21B 33/06 (2013.01); E21B 47/117 (2020.05)

(58) Field of Classification Search
CPC ....... G01M 3/26; G01M 3/2876; E21B 33/06; E21B 47/117
See application file for complete search history.

(56) References Cited

U.S. PATENT DOCUMENTS

| 5,090,234 | A | 2/1992 | Maresca et al. |
| 5,189,904 | A | 3/1993 | Maresca et al. |
| 6,328,542 | B1 | 12/2001 | Serafin et al. |
| 6,631,634 | B2 | 10/2003 | Cook et al. |
| 10,330,561 | B2 | 6/2019 | Hilpert et al. |
| 2003/0000693 | A1 | 1/2003 | Couren et al. |
| 2005/0269079 | A1 | 12/2005 | Franklin |
| 2007/0005250 | A1 | 1/2007 | Davila |
| 2008/0185143 | A1 | 7/2008 | Winters et al. |
| 2013/0031962 | A1 | 2/2013 | Nandwani et al. |

(Continued)

OTHER PUBLICATIONS

European Patent Office Search and Examination Report for Application No. 16774217.0 dated Sep. 24, 2020.

(Continued)

Primary Examiner — Erika J Villaluna
(74) Attorney, Agent, or Firm — Tumey L.L.P.

(57) ABSTRACT

A method and apparatus for testing blowout preventers for leaks involves maintaining a constant pressure in the portion of the blowout preventer to be tested. A sensor is connected to a controller for maintaining a constant pressure within the blowout preventer. Any amount of fluid introduced into or removed from the blowout preventer in order to maintain constant pressure is measured and is an indication of the leak rate in the blowout preventer. Additionally vibration instrumentation may be used to detect the location and amplitude of vibrations emitted by the test fluid passing from a high pressure regime to the low pressure regime across a leak path.

2 Claims, 6 Drawing Sheets

(56) References Cited

U.S. PATENT DOCUMENTS

2013/0111985 A1 5/2013 Veeningen
2013/0311097 A1 11/2013 Livesay et al.

OTHER PUBLICATIONS

International Search Report and Written Opinion for International Application No. PCT/US16/25315 dated Sep. 9, 2016.
International Preliminary Report on Patentability for Application No. PCT/US16/25315 dated Oct. 12, 2017.
USPTO Non-Final Office Action for U.S. Appl. No. 14/932,727 dated May 31, 2017.
USPTO Non-Final Office Action for U.S. Appl. No. 14/932,727 dated Dec. 7, 2017.
USPTO Final Office Action for U.S. Appl. No. 14/932,727 dated Jul. 27, 2018.
USPTO Notice of Allowance for U.S. Appl. No. 14/932,727 dated Dec. 10, 2018.
USPTO Issue Notification for U.S. Appl. No. 14/932,727 dated Apr. 3, 2019.
USPTO Notice of Allowance for U.S. Appl. No. 16/247,683 dated Apr. 17, 2019.
USPTO Issue Notification for U.S. Appl. No. 16/247,683 dated Aug. 7, 2019.
USPTO Examiner's Response to Appeal Brief for U.S. Appl. No. 15/360,861 dated Jan. 23, 2019.
USPTO Appeal Board Decision for U.S. Appl. No. 15/360,861 dated Apr. 16, 2020.
USPTO Patent Board Decision for U.S. Appl. No. 15/360,861 dated Apr. 16, 2020.
USPTO Corrected Notice of Allowance for U.S. Appl. No. 14/932,727 dated Mar. 26, 2019.
USPTO Non-Final Office Action for U.S. Appl. No. 15/151,323 dated Dec. 13, 2017.
USPTO Non-Final Office Action for U.S. Appl. No. 15/151,323 dated Jun. 28, 2017.
USPTO Final Office Action for U.S. Appl. No. 15/151,323 dated Jun. 28, 2018.
USPTO Examiner's Response to Appeal Brief for U.S. Appl. No. 15/151,323 dated May 29, 2019.
USPTO Corrected Notice of Allowance for U.S. Appl. No. 15/201,090 dated Mar. 19, 2019.
USPTO Notice of Allowance for U.S. Appl. No. 15/201,090 dated Feb. 15, 2019.
USPTO Issue Notification for U.S. Appl. No. 15/201,090 dated Jun. 5, 2019.
USPTO Non-Final Office Action for U.S. Appl. No. 15/201,090 dated Feb. 7, 2018.
USPTO Final Office Action for U.S. Appl. No. 15/201,090 dated Sep. 10, 2018.
Author: Unknown, Title: Technical Note 802—Leak Testing, Date: Jul. 2002, Publisher: Performance Pipe, Chevron Phillips Chemical Company LP, p. 5.
USPTO Non-Final Office Action for U.S. Appl. No. 15/360,861 dated Feb. 2, 2018.
USPTO Non-Final Office Action for U.S. Appl. No. 15/360,861 dated Jun. 29, 2017.
USPTO Non-Final Office Action for U.S. Appl. No. 15/797,087 dated Jun. 25, 2018.
Extended European Search Report for Application No. 16774217.0 dated Oct. 18, 2018.
USPTO Non-Final Office Action for U.S. Appl. No. 16/419,999 dated Sep. 2, 2020.
USPTO Non-Final Office Action for U.S. Appl. No. 15/360,861 dated Jul. 7, 2020.
USPTO Decision on Appeal for U.S. Appl. No. 15/151,323 dated Aug. 26, 2020.
USPTO Non-Final Rejection for U.S. Appl. No. 15/151,323 dated Nov. 10, 2020.

HYDROSTATIC AND VIBRATION TEST METHOD FOR A BLOWOUT PREVENTER

REFERENCE TO RELATED APPLICATIONS

This application is a continuation of U.S. patent application Ser. No. 16/247,683 filed Jan. 15, 2019 which is a divisional application of Ser. No. 14/932,727 filed Nov. 4, 2015 which application claims priority to U.S. Provisional Application Ser. No. 62/140,795 filed Mar. 31, 2015. The entire contents of the applications mentioned above are expressly incorporated herein by reference thereto.

BACKGROUND OF THE INVENTION

Field of the Invention

This invention is directed to a method and apparatus for testing hydraulically actuated safely systems such as blowout preventers for leaks.

Description of Related Arts Invention

Oil and Gas Exploration risk management includes the ability to control subsurface pressures which may be encounter during drilling operation. The primary mechanism utilized by operators to control downhole pressures is the hydrostatic pressure as a result of the drilling fluid contained within the wellbore. The drilling fluid is engineered and formulated to a density that provides a hydrostatic pressure inside of the wellbore that is greater than the formation pressure being drilled. In the majority of drilling operations, the hydrostatic control of wellbore pressure is adequate. However, from time-to-time the operator may encounter a higher than expected formation pressure where there is not adequate hydrostatic pressure to control the wellbore pressure. During these times the operator relies on a series of mechanical controls to stabilize the wellbore and prevent a "Blow Out". A blow out is the uncontrolled release of fluid or gas from the wellbore. This event is extremely dangerous and therefore must be avoided if at all possible. The primary mechanical control device utilized by operators to control wellbore pressure is the Blowout Preventer (BOP) assembly. The BOP assembly consists of multiple sealing and shearing devices that are hydraulically actuated to provide various means of sealing around the drill string or shearing it off entirely, completely sealing the wellbore. It is essential that the BOP assembly operate as designed during these critical operations. Therefore it is a regulatory requirement to test the functionality and the integrity of the BOP assembly before starting drilling operations and at specific events during the drilling operations. The BOP assembly test is a series of pressure tests at a minimum of two pressure levels, low pressure and high pressure. During the pressure test, intensifying fluid from a high pressure intensifying pump unit is introduced into the BOP assembly in a volume sufficient to cause the internal pressure within the BOP assembly to rise to the first pressure test level. Once the first pressure test level is established the high pressure intensifying pump unit is isolated from the BOP assembly and the pressure is monitored for at least five minutes. Current regulations require that the pressure does not decay at a rate greater than 5 psi/minute or 25 psi total over the entirety of the five minute test. Upon successful completion of the first test a subsequent high pressure test is performed. The requirement for the high pressure test is the same as the lower pressure test. The pressure decay rate must not exceed 5 psi/minute or 25 psi total over the entirety of the five minute test. These tests are generally referred to within the industry as a hydrostatic test. Hydrostatic testing is a very well know and established practice and testing of BOP assemblies has been a required test for many years. The equipment utilized to perform the test has not changed over the years and is very dated. The typical fixed displacement hydrostatic test system utilizes a high pressure triplex plunger intensifying pump, driven by a diesel motor. The fixed displacement hydrostatic test system features a clutch assembly and a reduction gearbox between the diesel motor and the high pressure triplex intensifying pump. The drive ratio between the diesel motor and high pressure triplex intensifying pump is fixed and cannot be adjusted or changed once the hydrostatic test has been initiated. Some fixed displacement hydrostatic test system utilize an electric motor and variable frequency drive in place of the diesel motor and clutch, but otherwise operate similarly and have the same limitations related to their fixed displacement design. Additionally, the fixed displacement hydrostatic test system utilizes at least one pressure gauge and one chart recorder. The pressure gauge depicts the test pressure and the chart recorder records the pressure over time. The technician controls the pressure and pump rate by varying the diesel engine speed and by engaging or disengaging the clutch. Some units feature a multiple ratio reduction gearbox to increase the controllability of the fixed displacement hydrostatic test system when performing low flow rate test. The gearbox ration is manually selected by the technician and must be set before the test is performed. The entire hydrostatic test is manually controlled by the technician. A successful test relies entirely upon the skill of the technician and his ability to control the fixed displacement hydrostatic test system and interpret the pressure gauge. The reliance on the skill of technician and the lack of automation and computerization to enhance controllability makes the testing process problematic. In addition the mechanical chart recorder lacks the necessary resolution to make definitive pass or fail decisions. This requires the technician to utilize their skill and judgment when deciding if the BOP passed or failed the hydrostatic pressure test.

Figure 1:
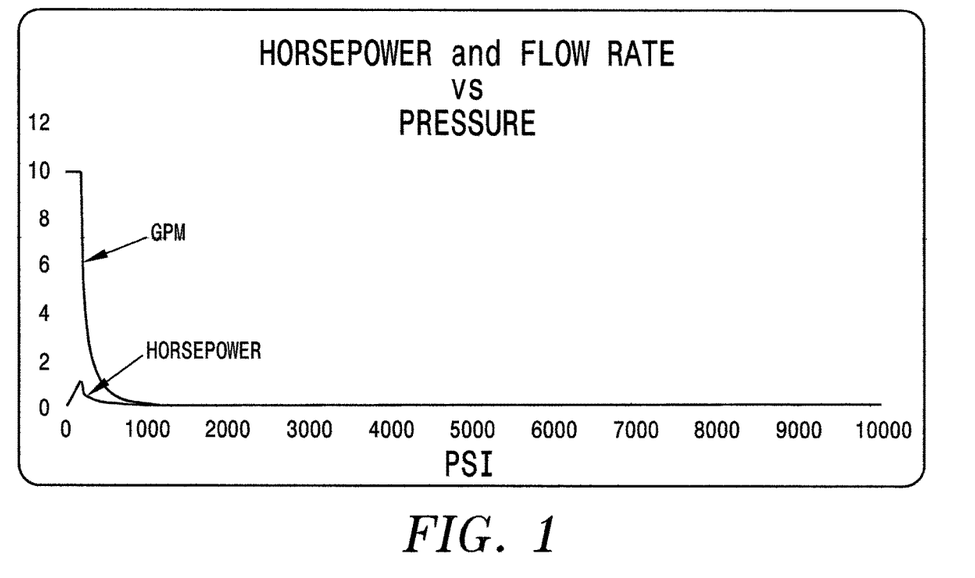
FIG. 1 is a graph showing the relationship between horsepower and flow rate verses pressure

A more specific description of the currently utilized fixed displacement hydrostatic test system will reveal further short comings. A disadvantage of the currently utilized fixed displacement hydrostatic test system is the size of the high pressure triplex intensifying pump and the horsepower require to operate it. During a typical BOP assembly hydrostatic test the rate at which the intensifying fluid is pumped into the BOP assembly varies greatly with pressure. Initially the BOP assembly may contain substantial amounts of uncompressed air. Therefore the initial pump rate of a typical closed BOP assembly hydrostatic test might be 10 GPM but will decrease exponentially as the air is compressed. The "GPM" series of the chart in FIG. 1 depicts the exponential decrease of pump rate in relation to the pressure increase during a typical 10,000 psi BOP assembly hydrostatic test. Additionally, the "Horsepower" series of the same chart depicts the theoretical horsepower requirement related to the pump rate at the same pressure with the equation:

$$\text{Horsepower} = \text{Pump Rate(gpm)} \times \text{Discharge Pressure (psi)}/1714.$$

As clearly depicted in FIG. 1 the pump rate exponentially decreases as pressure increases and at approximately 1,000 PSI the pump rate is less than 1 GPM. Typical high pressure triplex intensifying pumps currently utilized in fixed displacement hydrostatic test systems applicable to BOP assembly testing have a maximum operating speed of 600 rpm. The displacement of the high pressure triplex intensifying pump is related to the maximum operating speed and the maximum designed pump rate. A typical 10 gpm high pressure triplex intensifying pump designed to operate at 600 rpm will have an approximate displacement of 3.85 cubic inches per revolution "cir". The displacement of the high pressure triplex intensifying pump is fixed and therefore the torque to rotate the high pressure triplex intensifying pump at 10,000 psi is:

Displacement(cir)×Pressure(psi)/75.4=3.85×10,000/75.4=510.61ft-lbs torque.

Therefore, the theoretical horsepower to drive the high pressure triplex intensifying pump can be calculated with the equation:

RPM×Torque(ft-lbs)/5252=600×510/5252=58.26HP.

Figure 2:
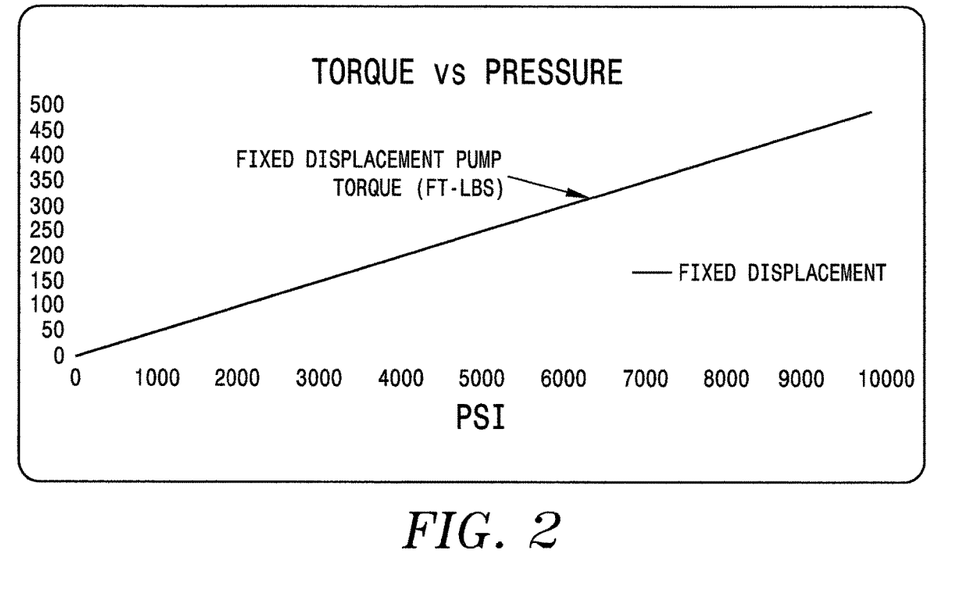
FIG. 2 is a graph showing the relationship between the torque requirement of a fixed displacement pump and pressure in the prior art.

This differs greatly from the actual horsepower required and is a result of the fixed displacement design. Typical fixed displacement hydrostatic test systems do not provided a means of matching the displacement and the required pump rate. Therefore the torque requirement of the fixed displacement hydrostatic test system increase linear with pressure. The relationship between torque and pressure for the fixed displacement pump is depicted in FIG. 2. Another disadvantage of the fixed displacement hydrostatic test system is the lack of displacement resolution at higher pressures. For example, to pressure a BOP assembly, with an initial air volume of 10 gallons, from 1,000 psi to 10,000 psi only requires approximately 0.15 gallons of additional intensifying fluid to be added to the BOP assembly. This is less than 1 revolution of the high pressure triplex pump currently utilized on typical fixed displacement hydrostatic test systems. This is very difficult to control and the final pressure is often overshot. If the overshoot is large enough the test must be repeated. A typical state-of-the-art fixed displacement hydrostatic test system is approximately 10 ft long×5 ft wide and 5 ft tall. It is powered by a 75 hp diesel motor and weighs approximately 5,000 lbs. Also note the fixed displacement hydrostatic test system is manually operated with no provision for computerized operation or data collection. A typical hydrostatic test cycle utilizing a typical fixed displacement hydrostatic system commences with the technician pumping intensifying fluid at a high flow rate until the pressure gauge initially responds to the increasing pressure within the BOP system.

Once the initial volume of air is compressed (very low pressure) the pressure will increase very rapidly. Therefore, due to the lack of displacement resolution, the technician will begin to "bump" the fixed displacement hydrostatic test system to achieve the final pressure. "Bumping" is practice or technique where the technician cycles the fixed displacement hydrostatic test system on and off as quickly as possible using the clutch. This practice or technique relies heavily on the skill of the technician and can be very problematic and time consuming. It is also very easy to overshoot the test pressure. If the test pressure is exceed by a specified amount the test will not be valid and must be performed again. Lastly, the results are recorded on a manual chart recorder. The chart recorder is a very crude way of recording the test pressures and pressure decay rate (psi/min). A typical chart recorder has a resolution of 250 or 500 psi per line segment. While the chart recorder does provide a record of the BOP assembly hydrostatic test, it does not provided data about the actual leak rate.

As previously mentioned the current regulations, related to the integrity of the BOP assembly, requires the BOP to have a decay rate of less than 5 psi/min or 25 psi total over the entirety of the five minute test. It is reasoned by the regulators that if a BOP has a decay rate less than or equal to the maximum allowed by the regulation then it does not have a volumetric leak rate sufficient enough to compromise the functionality and integrity of the BOP assembly. Another reason for using a pressure decay model for BOP testing was the lack of any economically viable technology with a resolution capable measuring the volumetric loss related to leak rate. The loss of fluid associated with a leak of sufficient size to cause a 5 psi/min decay rate is miniscule. It could be less than 0.00002 GPM depending on the amount of air in the BOP assembly during the initial phase of the test. Measuring these extremely low flow rates accurately utilizing conventional flow meters is not practical or in some cases even possible. It is also evident that measuring the leak rate by monitoring the rate of pressure decay is inherently inaccurate. For example: if a typical BOP assembly with a volumetric loss rate (leak) of approximately 0.000008 gpm is first tested with approximately 5 gallons of air trapped within the BOP assembly during the initial phase of the hydrostatic test and subsequently tested with the same volumetric loss rate (leak) but with approximately 2.5 gallons of air trapped within the BOP assembly during the initial phase of the hydrostatic test, the BOP would pass the first test with approximately a 3 psi/min pressure decay rate but it would fail the second test with approximately a 6 psi/min pressure decay rate. Each test would have the same volumetric loss rate (leak) but the result of the tests would be significantly different. The effects of reduced initial air volumes in the BOP assembly increase substantially until at some point the pressure decay rate test will not be a viable means of leak detection. If the BOP assembly is hydraulically locked it will not be possible to utilize a pressure decay hydrostatic test. It is sometime the practice of the hydrostatic test technician to add air to the BOP assembly to ensure testability. This practice, while ensuring testability of the BOP assembly, will most likely lead to erroneous results as previously discussed above. Additionally, the resolution of the recorder makes it difficult to ascertain the actual pressure decay rate and the decision of pass/fail is mostly that of the technician's interpretation of the data. Subsequent to obtaining a successful test the chart recorder paper is signed and submitted as proof that the BOP assembly meets or exceeds the pressure decay rate specifications of the applicable regulations. Lastly, the entire intensified circuit is relieved of the intensified fluid via the dump valve. The typical dump valve is a manually operated needle or tapered plug valve.

Metal seat valves are used due to the extreme fluid velocities across the valve seat when the intensified fluid is released. Additionally, the intensified fluid flowing back from the BOP assembly carries contaminates such as sand and grit picked up from the BOP assembly. These valves must be serviced often to ensure the metal seat have not been comprised by the intensified fluid release. The much preferred current available soft seat designs lack the integrity to provide reliable service in this harsh service.

Consequently, there is a need for an improved hydrostatic test system that provides for fully variable displacement and is compact and easily portable. Such a system should also include a computer or processor to control and automate the test cycle and provide for useful data such as leak rate and other environmental and mechanical properties of the BOP Assembly. Additionally the test data should be electronically stored and easily disseminated via local and wide area networks in real-time or subsequent to the completion of the test.

BRIEF SUMMARY OF SOME OF THE PREFERRED EMBODIMENTS

Figure 3:
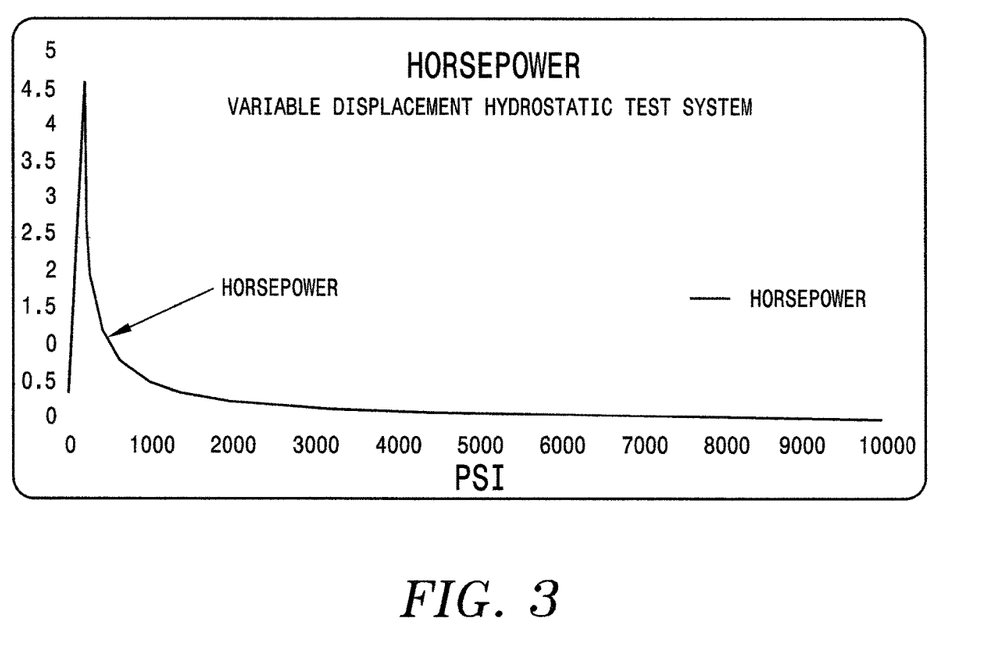
FIG. 3 is a graph showing the relationship between horsepower and pressure in a test system utilizing variable displacement pump.
Figure 4:
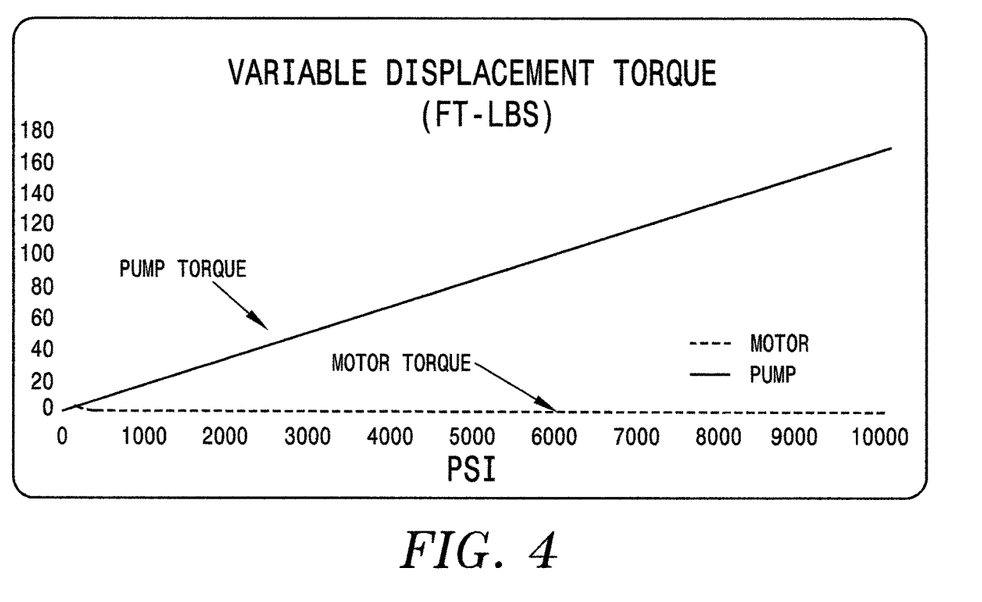
FIG. 4 is a graph showing the relationship between the torques of force required by the motor for the same pressure.

The present invention addresses these and other needs by providing a fully variable displacement hydrostatic test system that features a variable displacement hydraulic pump driven by an electric, air, internal combustion motor, or other suitable motivation. The variable displacement hydraulic pump provides a fully variable source of energy and therefore a fully variable drive ratio between the motivator and the intensifying pump(s). The intensifying pumps may be of linear or rotary design and may be equipped with a means of precisely measuring the volume discharged. The variable displacement hydrostatic test system automatically varies the intensifying pumps displacement based on pressure and flow feedback from the system to optimize the displacement. This allows for a repeatable, highly accurate, and responsive hydrostatic test. Another desirable benefit of displacement optimization associated with the variable displacement hydrostatic test system is the reduced physical size and reduced energy requirement. The variable displacement hydrostatic test system requires less than 5 horsepower to achieve the flow and pressure requirements of a typical hydrostatic test as compared to the 75 horsepower of the fixed displacement hydrostatic test system. FIG. 3 depicts the theoretical horsepower required by the variable displacement hydrostatic test system where the intensification rate is approximately 50 psi/second. Another advantage of the variable displacement hydrostatic test system is the ability to match the required torque or force required by the intensifying pumps to that of the motivator. FIG. 4 depicts the torque or force required at the intensifying pumps and that required by the motivator for the same pressure. As depicted in FIG. 4 the force or torque required by the intensifying pumps is linear to pressure while the force or torque at the motivator remains constant. This feature allows the variable displacement hydrostatic test system to use the power from the motivator much more efficiently than fixed displacement hydrostatic test systems. Additionally the variable displacement hydrostatic test system has a much greater displacement resolution than the currently utilized fixed displacement hydrostatic test system. For example, if the displacement of the variable displacement hydrostatic test system is manipulated to have a displacement 0.3 cir then the system will have approximately 10 times the displacement resolution as the fixed displacement hydrostatic test system. The fully variable feature of the variable displacement hydrostatic test system allows for displacements from 0.0 cir to maximum designed cir. The variable displacement hydrostatic test system is much more controllable than the fixed displacement hydrostatic test system and significantly reduces the chance of overshooting the final test pressure. In addition the efficiencies described previously allow for a much more compact design. A variable displacement hydrostatic test system equivalent in performance to the previously described fixed displacement hydrostatic test system would have dimensions of 48" wide×60" long×34" tall and weighs approximately 800 lbs.

Based on the algorithms subsequently described and using the displacement optimized intensifying pumps in conjunction with the computer processor to monitor and control the system in real time allows for a very precise, quick, and repeatable test that does not rely on the skill of the technician for completion or interpretation. The entire testing process is performed, based on the testing parameters, without intervention of the technician. Another feature of the variable displacement hydrostatic test system is the ability of the computer processor to store, and/or relay to a remote location, the test results for analysis or oversight. This allows for independent 3rd party verification of the BOP hydrostatic test. Additionally, the data can be logged with specific data about the BOP assembly such as serial number, rig number, and test location to help predict future BOP performance or maintenance requirements. The variable displacement hydrostatic test system features a novel and unique method of measuring the volumetric loss rate by offsetting the volumetric loss rate within the BOP assembly with sufficient intensifying fluid to maintain the test pressure as previously described above. An embodiment of the variable displacement hydrostatic test system features linear intensifying pumps that are equipped with a precision electronic transducer that precisely measures the displacement and subsequent volume of test fluid introduced into the BOP assembly allowing for direct measurement of the volumetric loss rate and pressure decay rate associated with all potential sources. Several advantages of utilizing the variable displacement hydrostatic test system in conjunction with the novel algorithms, subsequently described below, become apparent when applied to complex BOP assemblies. Current technology is limited to very simplistic pressure decay rate measurements only. The largest potential source of pressure decay, other than leakage, is the change in temperature of the trapped air, the intensification fluid, and the BOP assembly. Utilizing current fixed displacement hydrostatic testing technology it is necessary to wait for a period of time until the temperature stabilizes to obtain a valid test. This is a direct result of the lack of automation and displacement resolution of currently utilized fixed displacement systems. This can take several minutes or even hours. Today, the daily cost of a typical land base drilling rig can exceed $75,000 and offshore rigs can exceed US$350,000. A delay of a few hours can be very costly. The variable displacement hydrostatic test system utilizes a computer processor running a novel and unique algorithm applied to the resultant displacement measurements from the linear intensifying pumps, equipped with precision electronic transducers, at various test pressures, to mathematically isolate the leak rate component from the other potential sources of volumetric and pressure decay changes. This is possible because the leak rate is a nonlinear function of pressure, while the pressure decay rate due to temperature change is approximately linear when the test pressure is held constant over a short period of time. The nonlinear behavior of the leak rate is defined by Bernoulli's Principle where the velocity is proportional to the square root of differential pressure. Additionally the ability of the improved hydrostatic system to precisely measure the total volumetric loss over a period of time at a fixed pressure eliminates or mitigates other sources of volumetric and pressure decay changes. This is significantly different than current technology where the pressure is allowed to decay over time. This introduces linear and nonlinear changes to the pressure decay rate due to flexibility of the BOP assembly and adiabatic related changes to the air volume within the BOP assembly as the pressure decays. The ability of the improved hydrostatic test system to automatically maintain a constant pressure by either adding test fluid or removing test fluid from the BOP assembly in conjunction with the ability of the improved hydrostatic test system to precisely measure the amount of fluid added or removed is a unique and desirable capability. This capability allows for complete isolation of the linear and nonlinear responses applicable to the entire BOP assembly at a specific pressure. This unique feature allows for utilization of other technologies to identify the present of leak and possible the location of a leak.

One such technology is the utilization of vibration instrumentation such as accelerometers or acoustic sensors to detect the location and amplitude of minute vibrations emitted by the test fluid passing from the high pressure regime to the low pressure regime across the leak path. This is known technology and is widely utilized by municipalities and large industrial processing plants. In these applications the process stream (pressure source) is stable and can be monitored over long periods of time to establish benchmarks. These benchmarks can then be used to detect and variants. However migrating this technology into the field of BOP pressure testing has been problematic and to date unsuccessful. In contrast to fixed location municipalities and large industrial processing plants, BOP assemblies are mobile and their processing profile is ever changing. The improved hydrostatic test system provides for a method of first testing at a constant pressure and then at a different constant pressure. The vibration profile of the BOP assembly can then be compared at the two pressure level to identify the specific changes to the profile related to leak paths within the BOP assembly.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 5:
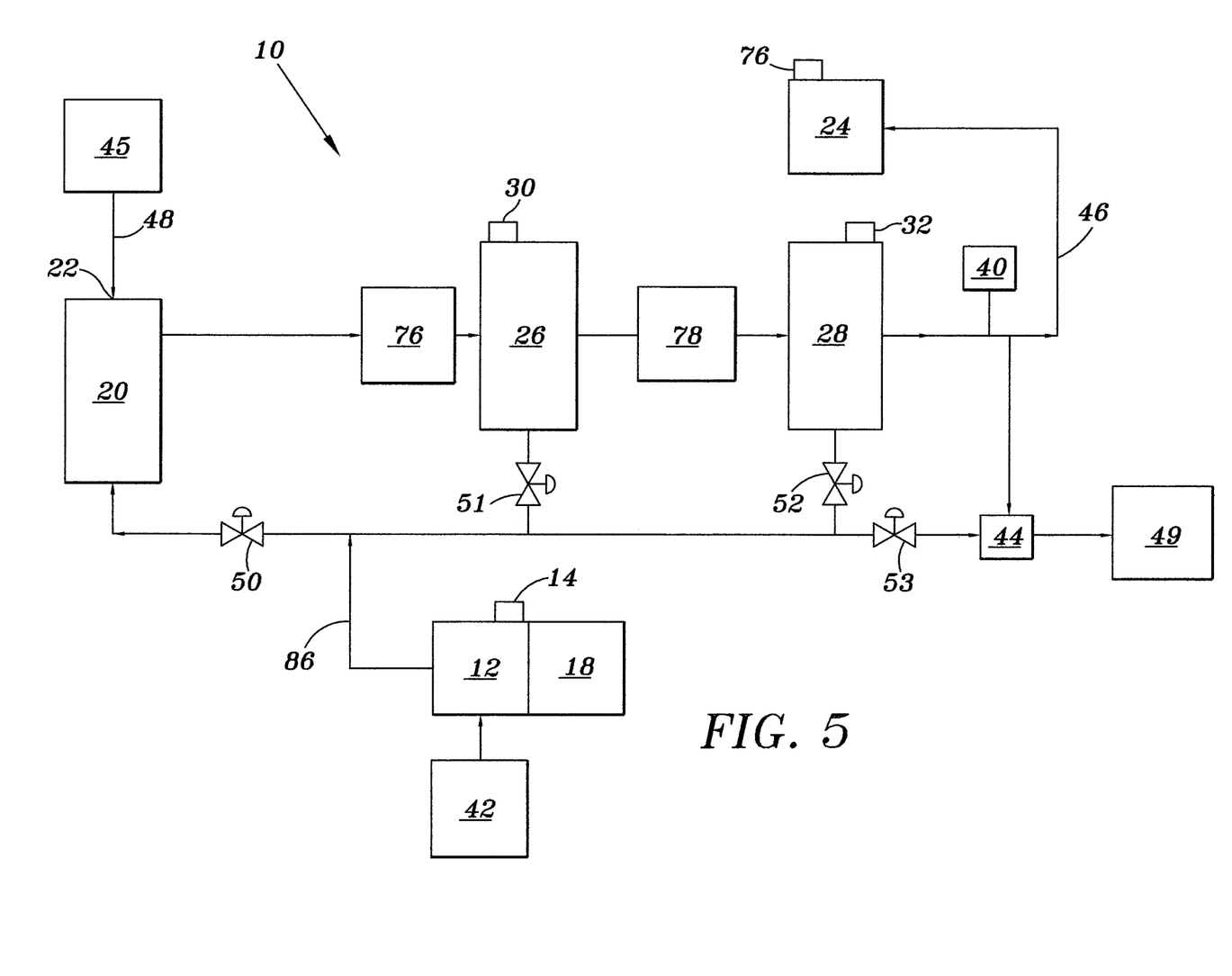
FIG. 5 is a schematic of a variable displacement hydrostatic test system according to an embodiment of the invention.

An embodiment of a variable displacement hydrostatic test system 10 is shown in FIG. 5. It includes a variable displacement hydraulic pump 12 driven by a suitable power source 18 such as an electric motor. Pump 12 is connected to a reservoir 42 containing hydraulic fluid. The pressure of fluid from the hydraulic pump is controlled by a valve 14 in a manner known in the art. Fluid from pump 12 enters intensifying pump 20 via valve 50. Intensifying pump 20 is connected to a source of water, or other suitable intensification fluid 45, via conduit 48.

Water under pressure exits intensifying pump 20 via a check valve 76 and enters a primary linear intensifying pump 26 which is driven by hydraulic fluid from hydraulic pump 12 via valve 51 and from there to a secondary linear intensifying pump 28 also driven by hydraulic pump 12 via valve 52. Hydraulic fluid from variable displacement pump 12 provides a variable energy source via valves 50, 51 and 52 at a rate and pressure required for operation of pumps 20, 26, and 28 in accordance with the requirements of pressure and flowrate shown in FIG. 1. A check valve 78 is positioned between pumps 26 and 28.

Figure 7:
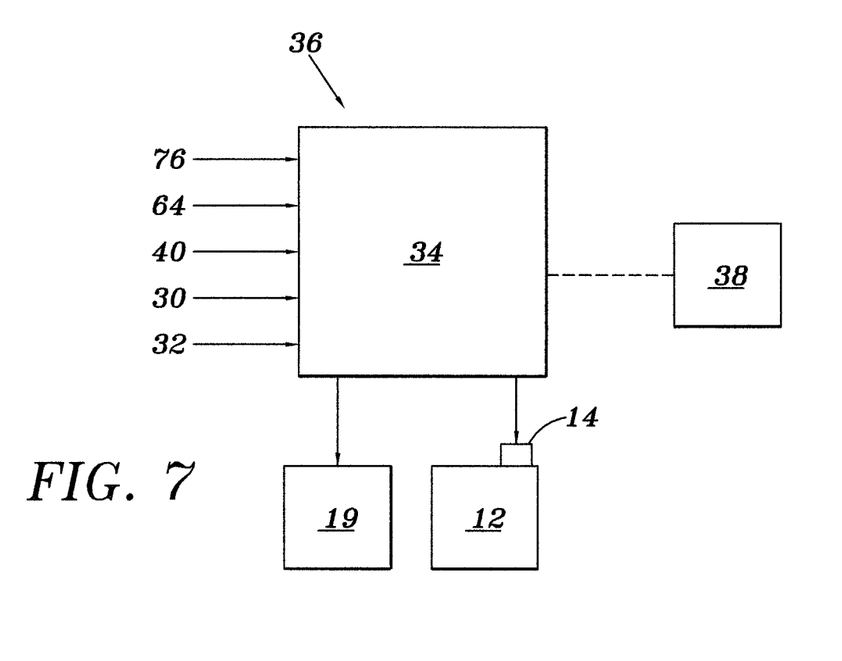
FIG. 7 is a schematic showing of a control system for the test apparatus of FIG. 5 or 6.

Hydraulic energy from variable displacement hydraulic pump 12 can be directed to dump valve 44 via valve 53 for operation as required. Rotary intensifying pump 20 is in fluid communication with water intake port 22 via conduit 48. Rotary intensifying pump 20 is in fluid communication with primary high pressure check valve 76, primary linear intensifier pump 26, and secondary linear intensifier pump 28, secondary high pressure check valve 78, dump valve 44, pressure transducer 40, conduit 46, and BOP assembly 24. Rotary intensifying pump 20 is of a positive displacement piston design. Intensifying fluid is displaced into BOP assembly 24 via conduit 46 to intensify the internal pressure of BOP assembly 24. Primary linear intensifying pump 26 intensifies the internal pressure within the BOP assembly 24 from a pressure test point to a subsequent higher pressure test point. Secondary intensifying pump 28 maintains the test pressure during the volume loss/pressure decay analysis phase of the hydrostatic test. Pressure transducer 40 provides a high resolution electronic signal representative of the pressure within BOP assembly 24. Dump Valve 44 relieves the intensified fluid within BOP assembly 24. Primary linear intensifying pump 26 and secondary linear intensifying pump 28 are equipped with precision electronic transducers 30 and 32 respectively which precisely measures the displacement of linear intensifying pumps 26 and 28. Vibration sensor or sensors 76 measure the energy level of vibration signals associated with vibration signals of the BOP assembly. The electronic signals from displacement transducers 30 and 32, pressure transducer 40 and vibration sensor 76 are communicated to computer processor 34 as shown in FIG. 7. The computer processor 34 is an integrated component of a control system 36, which includes HMI (Human Machine Interface) 38. The control system 36, including an HMI are further integrated into variable displacement hydrostatic test system 10.

Describing a typical test cycle of a variable displacement hydrostatic test system, hydraulic fluid from the variable displacement hydraulic pump is first provided at a rate and pressure sufficient for operation of the rotary intensifying pump in accordance with the requirements of the pressure/flow curve. The rotary intensifying pump is used to intensify the internal pressure of the BOP assembly to a first low pressure to substantially reduce the volume of air within the BOP assembly. Additionally the variable displacement hydrostatic test system may include at least one linear intensifying pump. The primary linear intensifying pump 26 intensifies the internal pressure within the BOP assembly from a pressure test point to a subsequent higher pressure test point. The much smaller secondary intensifying pump 28 is used to maintain the test pressure during the volume/pressure decay analysis phase of the hydrostatic test. It is important to note, that under certain environmental conditions, it may be necessary to reduce the volume of intensification fluid within the BOP assembly to maintain an approximate constant pressure within the BOP assembly. These environmental conditions most commonly occur where the BOP assembly is exposed to direct sunlight causing the BOP assembly to become warmer than the ambient environmental temperature. Subsequently, when intensification fluid, which is very near the ambient environmental temperature, is added to the BOP assembly to cause a pressure increase, heat is transferred from the BOP assembly to the intensification fluid causing the intensification fluid to increase in volume and therefore requiring intensifying pump 28 to reduce the volume of intensification fluid to maintain an approximately constant pressure within the BOP assembly. Secondary intensifying pump 28 is specifically designed to allow for, and precisely measure, the addition or reduction of intensification fluid as may be required to maintain an approximately constant pressure within the BOP assembly. The linear intensifiers allow for very finite and precision displacement resolution. The linear intensifying pumps are equipped with a precision electronic transducers 30, 32 that precisely measure the displacement of the linear intensifying pump. This method of measuring is extremely precise with very fine resolution allowing for accurate determination of the volume of intensifying fluid displace into the BOP assembly. The precise amount of intensifying fluid displacement is continuously monitored and controlled by an on-board computer processor.

A method of using variable displacement hydrostatic test system 10 may include the steps of: (1) deploy variable displacement hydrostatic test system 10; (2) confirm proper operation and startup of variable displacement hydrostatic test system 10; (3) perform hydrostatic test; (4) confirm and disseminate results of the hydrostatic test; (5) safely shut down variable displacement hydrostatic test system 10; and (6) decommission and prepare for transport variable displacement hydrostatic test system 10.

Figure 8:
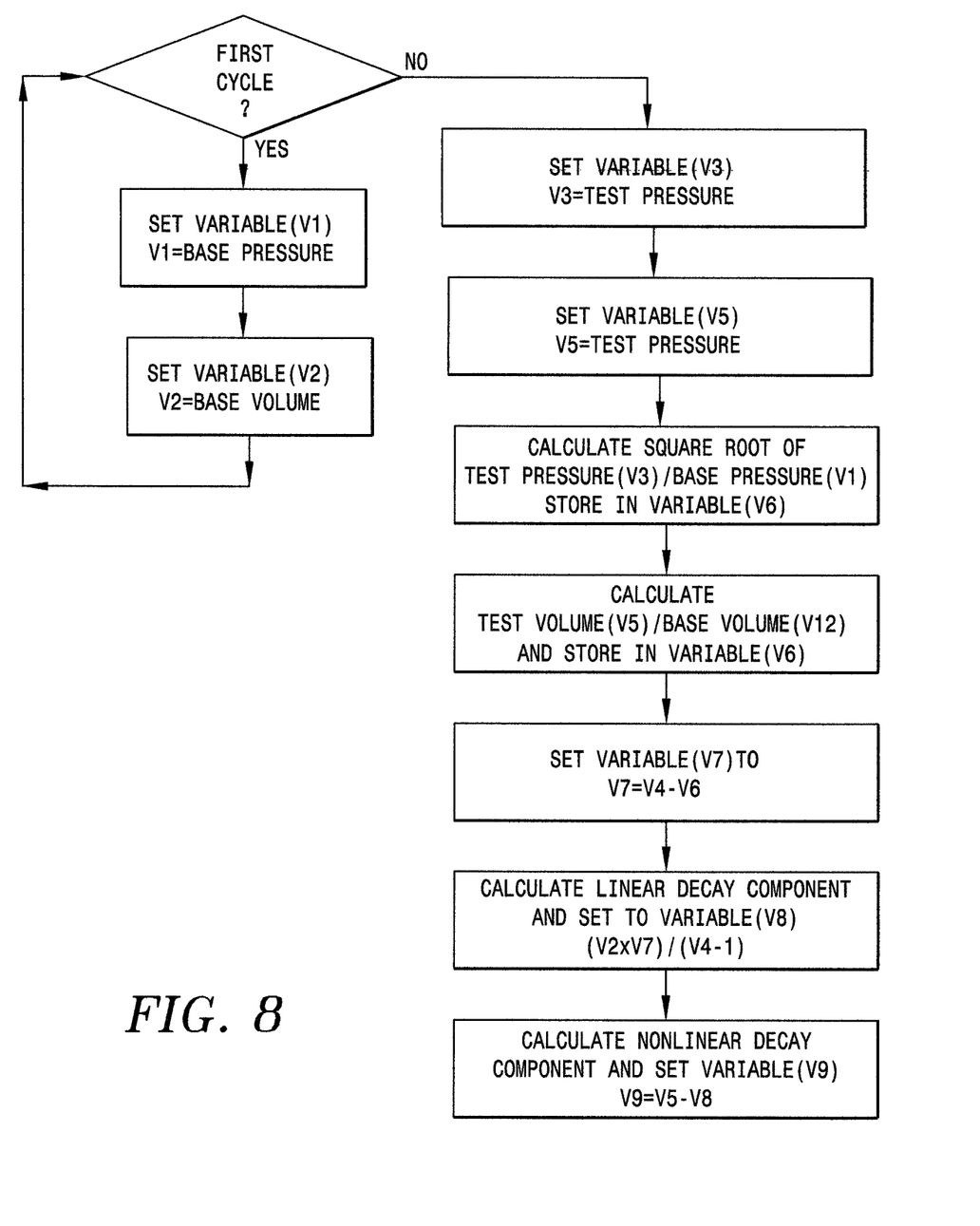
FIG. 8 is an algorithm processed in a computer processor.
Figure 9:
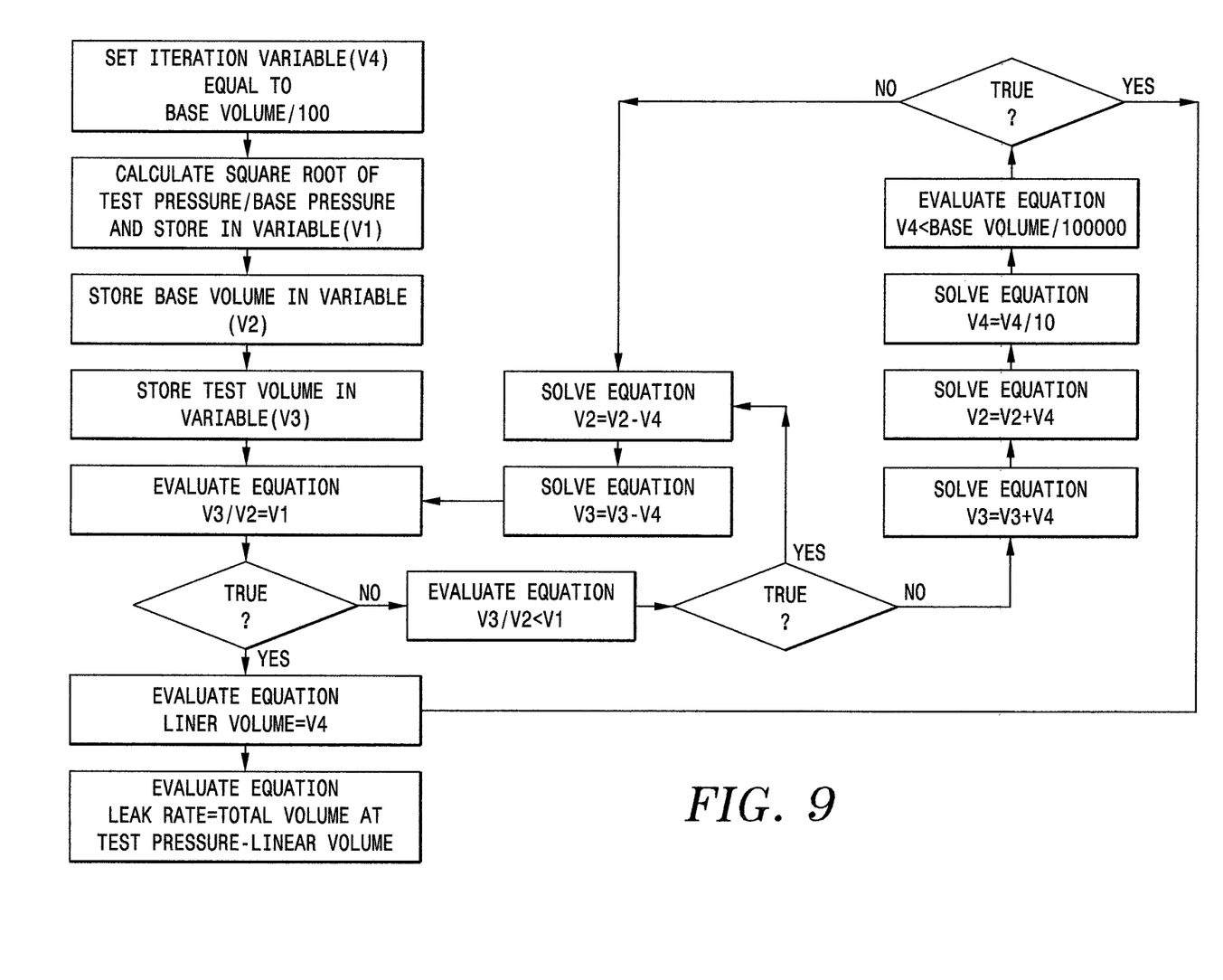
FIG. 9 is a second algorithm processed in a computer processor.

Deployment of variable displacement hydrostatic test system 10 in step (1) may include positioning variable displacement hydrostatic test system 10 in a convenient location which provides safe access to BOP assembly 24 and the required utilities. Connecting the required utilities and high pressure conduit 46 between variable displacement hydrostatic test system 10 and BOP assembly 24 to provide for a fluid connection between variable displacement hydrostatic test system 10 and BOP assembly 24. Confirming proper operation and startup of variable displacement hydrostatic test system 10 in step (2) may include energizing variable displacement hydrostatic test system 10. Verifying proper operation of control system 36. Hydrostatic testing utilizing variable displacement hydrostatic test system 10 step (3) may include setting the desired final test pressure according to the hydrostatic test specifications, and energizing electric motor 18 which further energizes variable displacement hydraulic pump 12. Variable displacement hydraulic pump 12 features integrated control valve 14. Integrated control valve 14 is of a modulated design where an electronic signal generated by computer processor 34 varies the output pressure of variable displacement hydraulic pump 12 in direct proportion to the signal generated by computer processor 34. Energizing variable displacement hydraulic pump 12 provides a variable hydraulic energy source. Close dump valve 44 by directing energized hydraulic fluid to dump valve 44. Dump valve 44 is in fluid communication with conduit 46 at a position between secondary intensifying pump 28 and BOP assembly 24. Initiate automated hydrostatic test cycle utilizing computer processor 34. Testing and collection of data via computer processor 34 is continuous but comprises distinctly different phases. Phase 1 initializes the automated hydrostatic test. Phase 2 and phase 3 are repeated two or more times throughout the intermediate portion of the hydrostatic test and phase 4 is performed subsequent to obtaining the final test pressure. Phase 1 of the automated hydrostatic test cycle may include diverting energized hydraulic fluid to rotary intensifying pump 20 at a rate and pressure in accordance with a specified pressure/flow curve of the hydrostatic test. An example of a typical pressure/flow curve is depicted in FIG. 1. Intensification fluid provided at intake port 22 is pumped and intensified by rotary intensifying pump 20 to BOP assembly 24 via conduit 46. BOP assembly 24 responds to the incoming intensified fluid both environmentally and mechanically as intensification increases. The pressure changes associated with the response to the intensified fluid are measured with pressure transducer 40. Pressure transducer 40 is in fluid communication conduit 46 at a position between secondary high intensifying pump 28 and BOP assembly 24. The responses are analyzed in real time by computer processor 34 utilizing common equations applicable to pressure drop and ideal gas laws computed through specific algorithms to calculate the compressibility factor of BOP assembly 24. The results of phase 1 test are recorded by computer processor 34 and depicted on HMI 38. At a specific test pressure identified by computer processor 34 utilizing the compressibility factor calculated during phase 1 the energized hydraulic fluid is isolated from rotary intensifying pump 20. Secondary high pressure check valve 78 prevents intensifying fluid from escaping conduit and therefore intensified fluid remains intensified. Commencing phase 2, energized hydraulic fluid is directed to primary linear intensifier 26 via valve 51 at a rate and pressure in accordance with a specified pressure/flow curve. At a specific test pressure identified by computer processor 34 utilizing the compressibility factor calculated during phase 1 the energized hydraulic fluid is isolated from primary linear intensifier 26. The displacement of primary linear intensifier 26 is measured utilizing precision electronic transducer 30. The measurement is recorded and time normalized to calculate rate of change by computer processor 34. The rate of change is utilized by computer processor 34 to refine the compressibility factor of BOP assembly 24 previously calculated during phase 1. Secondary high pressure check valve 78 prevents intensifying fluid from escaping conduit 46 and therefore intensified fluid remains intensified. Commencing phase 3, Energized hydraulic fluid is directed to the secondary linear intensifier 28 via valve 52 at a rate sufficient to maintain intensified fluid in conduit 46 at a specific test pressure approximately 50 psi above the highest pressure obtained during the immediately previous phase 2 test for a period of approximately 30 seconds. At the conclusion of the test period, energized hydraulic fluid is isolated from secondary linear intensifier 28. The displacement of secondary linear intensifier 28 is precisely measured utilizing precision electronic transducer 32. The measurement is recorded and time normalized to calculate rate of change by computer processor 34. Subsequently computer processor 34 utilizing one or both of the algorithms depicted in FIGS. 8 and 9, calculates the leak rate, if any, at the test pressure by solving the equations:

$$\sqrt{(P2/P1)}=(V2-Lf)/(V1-Lf)$$

Where: P1=Base Pressure (psi)=first test point in the previously described test sequence.

P2=Test Pressure (psi)=subsequent test points following the initial base test point.

V1=Base Volume (gpm)=volume added at base test pressure to maintain base pressure adjusted for time period.

V2=Test Volume (gpm)=volume added at subsequent test points to maintain test point pressure adjusted for time period.

Lf=the volumetric flow rate of the linear time decay component of the total volumetric decay rate.

Solving the above equation for any test point in comparison with the base test point will find the volumetric decay rate associated with temperature and other linear volumetric decay rates. Subsequently the nonlinear leak rate can be found with the equation:

$$Nf=V2-Lf$$

V2=Test Volume (gpm)=volume added at subsequent test points to maintain test point pressure adjusted for time period.

Lf=the volumetric flow rate of the linear time decay component of the total volumetric decay rate.

Nf=the volumetric flow rate of the nonlinear time decay component of the total volumetric decay rate.

The first cycle of phase 2 and phase 3 are considered the base cycle. The subsequent cycles of phase 2 and phase 3 are considered the test cycles. The results of phase 2 and phase 3 tests are recorded by computer processor 34 and depicted on HMI 38. Phase 2 and phase 3 are repeated by a number of times determined by computer processor 34, but not less than once. Preferably at least one secondary test would be performed at a pressure level equal to twice the pressure of the base test. Secondary high pressure check valve 78 prevents intensifying fluid from escaping conduit 46 and therefore intensified fluid remains intensified. Phase 4 is conducted at the final test pressure. During phase 4 the pressure reading from pressure transducer 40 are recorded over a specific time period determined by computer processor 34, but not less than 1 minute. The results of phase 4 test are recorded by computer processor 34 and depicted on HMI 38. Phase 4 is optional and dependent on the requirements of the hydrostatic test specifications. Phase 4 is consider to be equivalent to the currently utilized pressure decay test typical of currently utilized fixed displacement hydrostatic test systems. Subsequent to the completion of the hydrostatic test, dump valve 44 is de-energized. De-energizing dump valve 44, de-intensifies intensified fluid in conduit 46. Return intensification fluid received from BOP assembly 24 is directed away from variable displacement hydrostatic test system 10 via the dump valve 44 to a suitable reservoir 49. Dump valve 44 is of a soft seat design making it liquid tight which is essential for successful testing. Any leak at dump valve 44 would be interpreted by computer processor 34 as a potential leak of BOP assembly 24.

Figure 6:
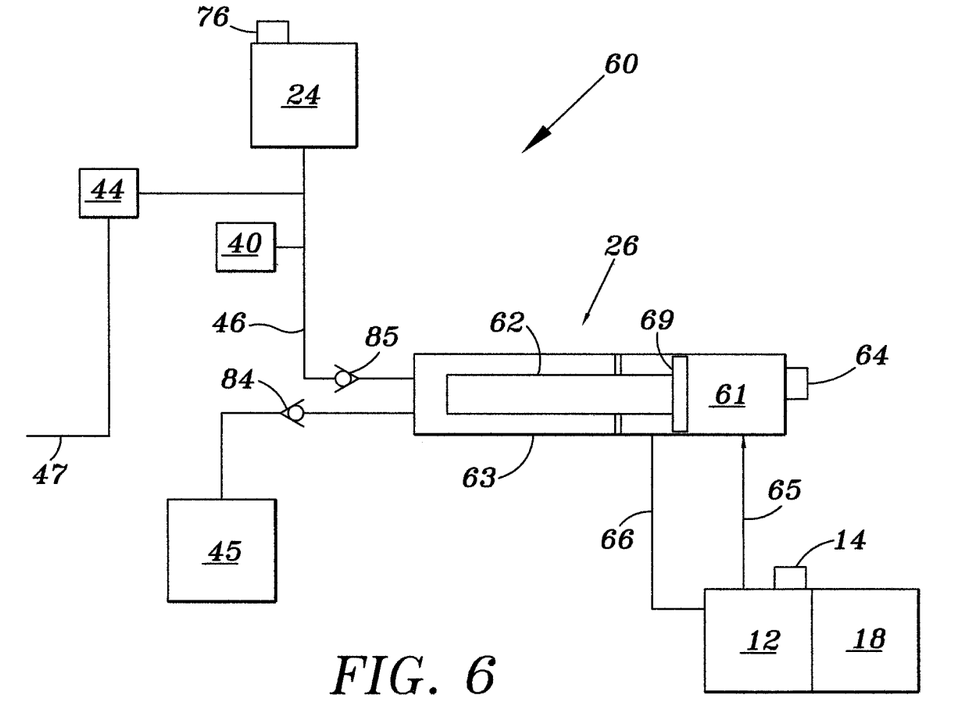
FIG. 6 is a schematic of a second variable displacement hydrostatic test system according to a second embodiment of the invention.

An additional embodiment 60 of the invention is shown in FIG. 6. Common elements from the embodiment of FIG. 5 have the same reference numerals.

In this embodiment the intensifying pump 26 which is of a well-known design includes a plunger 62 located in a hydrostatic chamber 63. A piston 69 is attached to the plunger 62 and is positioned within the hydraulic chamber 61.

A variable displacement hydraulic pump 12 which is driven by a prime motive source such as an electric motor 18 drives intensifier pump 26 via hydraulic lines 66 and 65 which are connected to the hydraulic power chamber 61 on either side of piston 69.

Variable displacement pump 12 may be of the type having a variable swash plate the position of which is controlled by a valve 14 in a manner known in the art.

Water from a reservoir 45 is drawn into hydrostatical chamber 63 through check valve 84 on the intake stroke of plunger 62 and is then directed to the blowout preventer 24 via check valve 85 and a conduit 46 during the exhaust stroke of the pump.

Pressure sensor 40 is located in conduit 46 and dump valve 44 is connected to conduit 46 for relieving pressure within the blowout preventer. One or more vibration sensors 76 are attached to the blowout preventer at various points to detect vibrations caused by leakage through the various components of the blowout preventer.

This embodiment utilizes a single pump for pressurizing the blowout preventer, however a plurality of pumps may also be used. The same pump can also be used to maintain the pressure within the blowout preventer during the test to measure the addition of any fluid necessary to maintain constant pressure within the portion of the blowout preventer.

Should the pressure decrease during the test, controller 34 as a result of a signal from pressure transducer 40 will send a signal to valve 14 to increase the pressure from variable displacement pump 12 as depicted in FIG. 7. This will cause piston 69 of intensifier pump 63 to move a finite distance which corresponds to the amount of fluid added to the blowout preventer in order to maintain constant pressure. This distance is sensed by sensor 64 and the information is sent to controller 34 for processing.

Additionally vibration analysis may be performed in conjunction with or separately from the just previously describe automated hydrostatic test using the same unique constant pressure test methodology. More specially, an automated hydrostatic test that includes vibration analysis may include setting the desired final test pressure according to the hydrostatic test specifications. Energizing electric motor 18 energizes variable displacement hydraulic pump 12. Variable displacement hydraulic pump 12 features integrated control valve 14. Integrated control valve 14 is of a modulated design where an electronic signal generated by computer processor 34 varies the output pressure of variable displacement hydraulic pump 12 in direct proportion to the signal generated by computer processor 34. Energizing variable displacement hydraulic pump 12 provides a variable hydraulic energy source to hydraulic chamber 61. Close dump valve 44 by directing energized hydraulic fluid to dump valve 44. Dump valve 44 is in fluid communication with conduit 46 at a position between secondary intensifying pump 28 and BOP assembly 24. Initiate automated hydrostatic test cycle utilizing computer processor 34. Testing and collection of data via computer processor 34 is continuous but comprises distinctly different phases. Phase 1 initializes the automated hydrostatic test. Phase 2 and phase 3 are repeated two or more times throughout the intermediate portion of the hydrostatic test and phase 4 is performed subsequent to obtaining the final test pressure. Phase 1 of the automated hydrostatic test cycle may include diverting energized hydraulic fluid 74 to rotary intensifying pump 20 at a rate and pressure in accordance with a specified pressure/flow curve of the hydrostatic test. An example of a typical pressure/flow curve is depicted in FIG. 1. Intensification fluid provided at intake port 22 is pumped and intensified by rotary intensifying pump 20 to BOP assembly 24 via conduit 46. BOP assembly 24 responds to the incoming intensified fluid both environmentally and mechanically as intensification increases. The pressure changes associated with the response to the intensified fluid are measured with pressure transducer 40. Pressure transducer 40 is in fluid communication with conduit 46 at a position between secondary intensifying pump 28 and BOP assembly 24. The responses are analyzed in real time by computer processor 34 utilizing common equations applicable to pressure drop and ideal gas laws computed through specific algorithms to calculate the compressibility factor of BOP assembly 24. The results of phase 1 test are recorded by computer processor 34 and depicted on HMI 38. At a specific test pressure identified by computer processor 34 utilizing the compressibility factor calculated during phase 1 the energized hydraulic fluid is isolated from rotary intensifying pump 20. Secondary high pressure check valve 78 prevents intensifying fluid from escaping conduit 46 and therefore intensified fluid remains intensified. Commencing phase 2, energized hydraulic fluid is directed to primary linear intensifier 26 via valve 51 at a rate and pressure in accordance with a specified pressure/flow curve. At a specific test pressure identified by computer processor 34 utilizing the compressibility factor calculated during phase 1 the energized hydraulic fluid is isolated from primary linear intensifier 26. The displacement of primary linear intensifier 26 is measured utilizing precision electronic transducer 30. The measurement is recorded and time normalized to calculate rate of change by computer processor 34. The rate of change is utilized by computer processor 34 to refine the compressibility factor of BOP assembly 24 previously calculated during phase 1. Secondary high pressure check valve 78 prevents intensifying fluid from escaping conduit 46 and therefore intensified fluid remains intensified. Commencing phase 3, Energized hydraulic fluid is directed to the secondary linear intensifier 28 via valve 52 at a rate sufficient to maintain intensified fluid at a specific test pressure approximately 50 psi above the highest pressure obtained during the immediately previous phase 2 test for a period of approximately 30 seconds. During the 30 second period, measurements from at least one vibration sensor 76 but preferably more than one vibration sensor 76 are recorded by computer processor 34. At the conclusion of the test period, energized hydraulic fluid is isolated from secondary linear intensifier 28. Phase 2 and phase 3 are repeated two or more times throughout the intermediate portion of the hydrostatic test. At the conclusion of the testing utilizing phase 2 and phase 3, computer processor 34, using commonly available vibration analysis algorithms, identifies differences between the base test and subsequent test. Specifically computer processor 34 identifies differences in the energy level of the vibration signals between the base test and subsequent test. It is known within the industry that the energy level of the vibration signals of water turbulent flow passing from a high pressure regime to a low pressure regime is approximately proportional to the differential pressure between the high and low pressure regimes. Therefore it would be an indication of a leak if the energy level of the vibration signal increase approximately proportional to the increased pressure. Conversely it would be an indication of the absent of a leak if the energy level of the vibration signal remained principally the same thought the series of different pressure level test.

Confirmation and dissemination of the results of the hydrostatic test step (4) may include transfer of applicable hydrostatic data, via information technology system 19, onto portable media or transfer via local and/or wide area networks both wired and wireless. Confirmation may include acceptance the test by a 3rd party at the location or a remote location. Shut down of variable displacement hydrostatic test system 10 step (5) may include operation of the emergency stop. Decommissioning variable displacement hydrostatic test system for transportation step (6) may include disconnection and storage of utilities and disconnection and storage of high pressure hose 46.

While a preferred embodiment of the present invention has been described it is meant as illustrative only and not limiting in scope. A full range of equivalents, many variations and modification, may be naturally occurring from those skilled in the art after review hereof.

Although the present invention and its advantages have been described in detail, it should be understood that various changes, substitutions and alterations may be made herein without departing from the spirit and scope of the invention as defined by the appended claims.

For example an electric cylinder embodiment of the system utilizes electrically operated cylinders that offer the same extend and retract functionality of the hydraulic cylinders. They are usually of a ball screw design to reduce friction and accommodate high working forces. Additionally the electric motor utilized is capable of full torque at zero speed. The primary electric cylinder is mechanically coupled to a water intensification cylinder. The dump valve electric cylinder is mechanically coupled to the dump valve. There is a pressure sensor in fluid communication with the water intensification cylinder. Additionally the water intensification cylinder is in fluid communication with a water source, the dump valve, and the BOP Assembly. In operation, an electric source is precisely controlled by a motor controller, such as a variable frequency drive, commanded by a computer controller, to cause both the primary electric cylinder and the dump valve electric cylinder to extend. The action of the dump valve electric cylinder extending causes the dump valve to close. The action of the primary electric cylinder extending causes the water intensification cylinder to displace water intensification fluid into the BOP Assembly thereby causing a pressure increase within the BOP Assembly. This action of displacing water intensification fluid, Causing pressure increase within the BOP assembly, continues until the pressure within the BOP Assembly reaches the desired pressure level. Subsequent to reaching the desired pressure level, the computer controller precisely controls the torque of the electric motor driving the primary electric cylinder to maintain the pressure within the BOP Assembly at a constant pressure at or very near the desired pressure. Subsequent to completing the test the primary electric cylinder is commanded to the fully retracted position. The dump valve electric cylinder is commanded to the fully retracted position, causing the dump valve to open, releasing the test pressure from the BOP assembly.

An air cylinder embodiment of the system utilizes air operated cylinders that offer the same extend and retract functionality of the hydraulic cylinder except that the hydraulic power source is replaced with a pressurized air source. The primary air cylinder is mechanically coupled to a water intensification cylinder. The dump valve air cylinder is mechanically coupled to the dump valve. There is a pressure sensor in fluid communication with the water intensification cylinder. Additionally the water intensification cylinder is in fluid communication with a water source, the dump valve, and the BOP assembly. In operation an air source, precisely controlled by an automated pressure regulator and commanded by a computer controller, is directed to the extend port of the primary air cylinder and the extend port of the dump valve air cylinder via an air control block to cause both the primary air cylinder and the dump valve air cylinder to extend. The action of the dump valve air cylinder extending causes the dump valve to close. The action of the primary air cylinder extending causes the water intensification cylinder to displace water intensification fluid into the BOP assembly thereby causing a pressure increase within the BOP Assembly. This action of displacing water intensification fluid, causing a pressure increase within the BOP assembly, continues until the pressure within the BOP assembly reaches the desired pressure level. Subsequently to reaching the desired pressure level, the computer controller precisely controls the air pressure of the system, via the air control block, to maintain the pressure with the BOP assembly at a constant pressure at or very near the desired pressure. Subsequent to completing the test the air pressure is redirected to the retract port of the primary hydraulic cylinder causing the primary hydraulic cylinder to move to the fully retracted position and to the retract port of the dump cylinder, causing the dump valve to open, releasing the test pressure from the BOP assembly.

What is claimed is:

1. A method of testing for leaks in a portion of a blowout preventer device for an oil/gas well comprising:
    a. pressurizing the portion of the blowout preventer system to a first pressure level,
    b. maintaining the blowout preventer system at the first pressure level by adding or subtracting test fluid into the blowout preventer system,
    c. measuring the amplitude of vibrations emitted by a test fluid passing from a high pressure location to a low pressure location within the portion of blowout preventer system to be tested,
    d. raising the pressure within the portion of blowout preventer system to a second higher pressure level,
    e. maintaining the pressure level by adding or removing test fluid from the portion of blowout preventer system to be tested,
    f. measuring the amplitude of vibrations emitted by the test fluid passing from the same high pressure level location to a low pressure location within the portion of blow out preventer system to be tested, and
    g. determining a leak rate by comparing the amplitude of vibration at the first and second level,
    wherein the portion of the blowout preventer to be tested is a valve.

2. The method of testing for leaks in a portion of a blowout preventer device for an oil/gas well comprising:
    a. pressurizing the portion of the blowout preventer system to a first pressure level,
    b. maintaining the blowout preventer system at the first pressure level by adding or subtracting test fluid into the blowout preventer system,
    c. measuring the amplitude of vibrations emitted by a test fluid passing from a high pressure location to a low pressure location within the portion of blowout preventer system to be tested,
    d. raising the pressure within the portion of blowout preventer system to a second higher pressure level,
    e. maintaining the pressure level by adding or removing test fluid from the portion of the blowout preventer system to be tested,
    f. measuring the amplitude of vibrations emitted by the test fluid passing from the same high pressure level location to a low pressure location within the portion of blow out preventer system to be tested, and
    g. determining a leak rate by comparing the amplitude of vibration at the first and second level,
    wherein the portion of the blowout preventer to be tested includes a safety device.

* * * * *